(12) United States Patent
Stanwood et al.

(10) Patent No.: US 10,003,919 B2
(45) Date of Patent: Jun. 19, 2018

(54) INTELLIGENT GEO-FENCING

(71) Applicant: Taiwan Semiconductor Manufacturing Co., Ltd., Hsinchu (TW)

(72) Inventors: Kenneth L. Stanwood, Vista, CA (US); David Gell, San Diego, CA (US); Erik Colban, San Diego, CA (US)

(73) Assignee: Taiwan Semiconductor Manufacturing Co., Ltd., Hsinchu (TW)

( * ) Notice: Subject to any disclaimer, the term of this patent is extended or adjusted under 35 U.S.C. 154(b) by 102 days.

(21) Appl. No.: 14/966,970

(22) Filed: Dec. 11, 2015

(65) Prior Publication Data
US 2016/0192132 A1 Jun. 30, 2016

Related U.S. Application Data

(60) Provisional application No. 62/090,578, filed on Dec. 11, 2014, provisional application No. 62/112,568, filed on Feb. 5, 2015.

(51) Int. Cl.
H04W 24/00 (2009.01)
H04W 4/02 (2018.01)

(52) U.S. Cl.
CPC .................. *H04W 4/021* (2013.01)

(58) Field of Classification Search
CPC ....... H04W 4/02; H04W 4/021; H04W 4/008; H04W 64/00; H04W 4/025; H04W 4/04; H04W 48/04; H04W 60/04; H04W 88/08; H04W 4/00; H04W 4/043; H04W 4/185; H04W 52/0251; H04W 84/18; H04W 88/06

USPC .................................. 455/456.1–456.6, 457
See application file for complete search history.

(56) References Cited

U.S. PATENT DOCUMENTS

| | | | |
|---|---|---|---|
| 6,721,652 B1 | 4/2004 | Sanqunetti | |
| 6,983,202 B2 | 1/2006 | Sanqunetti | |
| 7,680,590 B2 | 3/2010 | Sanqunetti | |
| 8,725,417 B1 * | 5/2014 | Young .................. | G08G 5/0052 701/528 |

(Continued)

OTHER PUBLICATIONS

UC Berkley Electrical Engineering and Computer Science, "people.eecs.berkley.edu/~jrs/papers/meshbook/chapter2.pdf", Oct. 25, 2012, Chapter 2, pp. 31-41.*

(Continued)

*Primary Examiner* — Anthony Addy
*Assistant Examiner* — Matthew Genack
(74) *Attorney, Agent, or Firm* — JCIPRNET

(57) ABSTRACT

A method and system of establishing a fence network is provided. The fence network comprises a plurality of fence nodes in communication with each other and a plurality of fence vertices defining a geographic fence. The method comprises configuring the plurality of fence nodes, setting up a coordinate system to determine a position of each fence node of the plurality of fence nodes, and, for each fence vertex, setting a location marker at a position of the fence vertex and using the location marker to register the position of the fence vertex. At least one fence vertex may be located at a position other than a position of a fence node. The plurality of fence vertices may be registered in sequential order and connected in order of registration.

15 Claims, 13 Drawing Sheets

(56) References Cited

U.S. PATENT DOCUMENTS

| | | | |
|---|---|---|---|
| 2003/0153329 A1* | 8/2003 | Stefan | H04B 7/18545 |
| | | | 455/456.1 |
| 2013/0180468 A1* | 7/2013 | Dutcher | H04W 4/021 |
| | | | 119/721 |
| 2015/0254982 A1* | 9/2015 | Goudy | G08G 1/165 |
| | | | 340/435 |
| 2016/0196577 A1* | 7/2016 | Reese | G06Q 30/0252 |
| | | | 705/14.5 |

OTHER PUBLICATIONS

Michael Viot; Automotive Security: Why UWB Measures Up; Embedded Systems Engineering; Sep./Oct. 2014; pp. 6-10.

Institute of Electrical and Electronics Engineers, Inc.; IEEE Standard for Local and metropolitan networks—Part 15.4: Low-Rate Wireless Personal Area Networks (LR-WPANS); Sep. 5, 2011; pp. 1-294.

DecaWave, Ltd.; Overview of DWM1000 Module; 2013; pp. 1-2.

DecaWave, Ltd.; Overview of DW1000 ScenSor (Seek Control Execute Network Sense Obey Respond); 2013; pp. 1-2.

\* cited by examiner

INTELLIGENT GEO-FENCING

BACKGROUND OF THE INVENTION

Field of the Invention

The present invention relates generally to fence networks and more particularly to methods of intelligently establishing and monitoring geo-fences.

Description of the Related Art

A geo-fence is a virtual barrier that uses a global positioning system (GPS), radio frequency identification (RFID), or other location based identification to define boundaries. Programs that incorporate geo-fencing set up triggers so that when a device enters (or exits) the boundaries defined by the geo-fence, an alert is sent. The technology has many practical uses. For example, a retailer can create a geo-fence a retail store in a mall or shopping center and send a coupon to a customer who has downloaded a particular mobile app when the customer (and his smartphone) crosses the boundary. Electronic ankle bracelets have long been used with geo-fencing to alert authorities if an individual under house arrest leaves the premises. In order to establish the geo-fence, the nodes involved need to know the shape and boundaries of the fence.

BRIEF SUMMARY OF THE INVENTION

Embodiments of the present disclosure address deficiencies of the art in respect to geo-fence networks and provide a novel and non-obvious method, system and computer program product for establishing and monitoring intelligent geo-fence networks. In accordance with one aspect of the present disclosure, a method of establishing a fence network is provided. The fence network comprises a plurality of fence nodes in communication with each other and a plurality of fence vertices defining a geographic fence. The plurality of fence nodes are configured. A coordinate system is set up to determine a position of each fence node of the plurality of fence nodes. For each fence vertex, a location marker is set at a position of the fence vertex used to register the position of the fence vertex.

In accordance with another aspect of the present disclosure, a fence network comprises a plurality of fence nodes in communication with each other, a plurality of fence vertices defining a geographic fence and a plurality of sides of the geographic fence. The plurality of sides of the geographic fence are determined by configuring the plurality of fence nodes, setting up a coordinate system to determine a position of each fence node of the plurality of fence nodes, and for each fence vertex, setting a location marker at a position of the fence vertex and using the location marker to register the position of the fence vertex.

In accordance with yet another aspect of the present invention, a computer program product for establishing a fence network is provided. The fence network comprises a plurality of fence nodes in communication with each other and a plurality of fence vertices that define a geographic fence. The computer program product comprises a storage medium readable by a processing circuit and storing instructions for execution by the processing circuit for performing a method. The method comprises configuring the plurality of fence nodes, setting up a coordinate system to determine a position of each fence node of the plurality of fence nodes, and for each fence vertex, setting a location marker at a position of the fence vertex and using the location marker to register the position of the fence vertex.

Additional aspects will be set forth in part in the description which follows, and in part will be obvious from the description, or may be learned by practice of the disclosure. The aspects will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Figure 1:
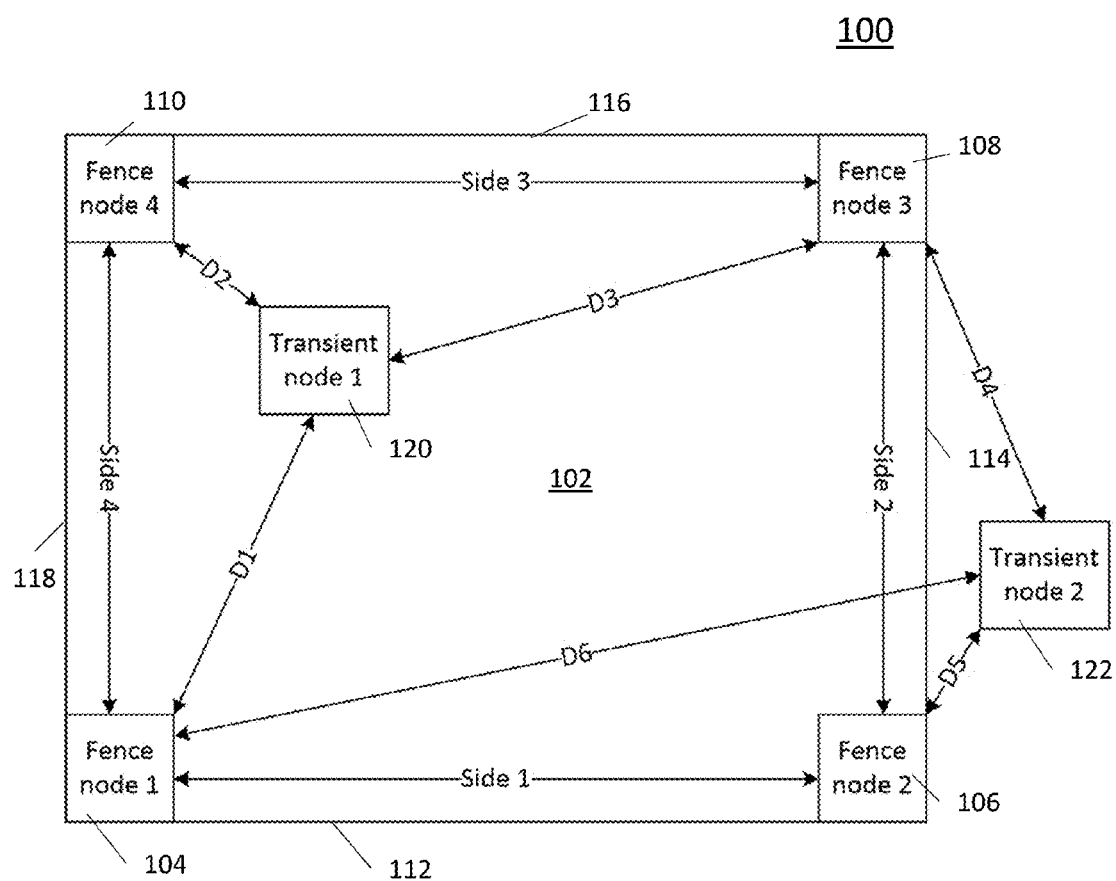
FIG. 1 is a schematic illustration of an example geo-fence system in accordance with one aspect of the present disclosure.

Embodiments of the invention provide for a method, system, fence node and computer program product for intelligently establishing and monitoring geo-fences. FIG. 1 is a schematic illustration of an example geo-fence system 100 in accordance with one aspect of the present disclosure. The example system 100 contains a geo-fenced area 102 (also referenced herein simply as a "fence" or "geo-fence") defined by four nodes 104, 106, 108, 110 acting as fence nodes. The fence nodes 104, 106, 108, 110 are used in defining the boundary of the fence 102 having four sides 112, 114, 116, 118 and determining whether a transient node 120, 122 is inside or outside the fence 102 through trilateration. The four fence nodes 104, 106, 108, 110 define a geo-fence 102. One of the four fence nodes 104, 106, 108, 110 may act as the master fence node while the others act as slave fence nodes. A master fence node acts as the master of the fence nodes 104, 106, 108, 110 comprising a fence 102. All other fence nodes operate as slave nodes.

The communication network established between the nodes, for instance using communications such as ultra-wideband (UWB) is known as a "fence network."

The system 100 also contains two transient nodes 120, 122. Transient node 120 may be determined to be inside the fence 102 by determining distances D1, D2, and D3 and using trilateration methods known to one skilled in the art. Similarly, transient node 122 may be determined to be outside the fence by determining distances D4, D5, and D6.

Nodes 104, 106, 108, 110, 120, 122 consist of any device that can communicate on the fence network, including master fence nodes, slave fence nodes and transient nodes. Such devices may include cellular phones, smartphones, wireless routers, gateways, access points, servers, laptop computers, desktop computers, range extenders or any other electronic device equipped to communicate over a fence network.

Figure 2:
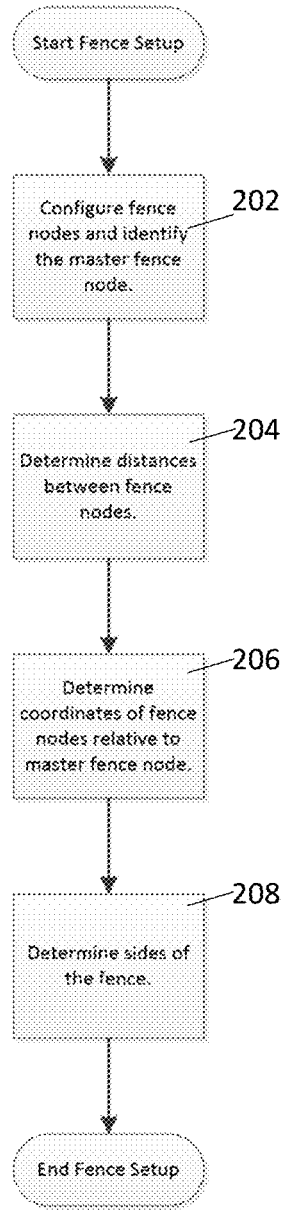
FIG. 2 is a flowchart illustrating an example process for creating a geo-fence in accordance with one aspect of the present disclosure.

Referring now to FIG. 2, a flowchart 200 illustrating an example process for creating a geo-fence in accordance with one aspect of the present disclosure is provided. Beginning at step 202, the fence nodes 104, 106, 108, 110 are configured and the master fence node is identified. This configuration may include determining the number of nodes in the fence 102, assigning IDs to the fence nodes 104, 106, 108, 110, determining the channel characteristics of the fence network (e.g., frequency, bandwidth, preambles, codes, etc.), and identifying the master fence node. Configuration may take place by numerous means including, but not limited to, attaching the nodes to a computer for configuration via wired or wireless communications, setting switches on or in the fence nodes 104, 106, 108, 110, or a combination. Some attributes may be chosen by scanning for neighboring fence networks and avoiding similar configurations, such as channel, preambles, or codes used.

When determining the number of nodes of the fence 102, a number of methods may be used. In an embodiment, nodes may be configured with a fence ID and all nodes report their fence ID and listen for other nodes with the same fence ID, learning the number of nodes in the fence. In an alternate embodiment, the master fence node broadcasts a request for fence nodes configured with a particular fence ID to identify themselves. Fence nodes with the corresponding fence ID transmit a response including fence ID and node ID. The master fence node receives responses and counts the number of unique node IDs. Various collision mitigation methods may be used to eliminate or reduce the effect of simultaneous responses (e.g., Carrier sense multiple access with collision avoidance (CSMA/CA), multiple transmissions, etc.).

The fence ID also enables the fence nodes of neighboring fences to know which fence nodes are in their own fence and which are not. In an alternate embodiment, the fence node devices are programmed with the number of fence nodes. This programming may be, for instance, by setting switches on or in the fence node, connecting each fence node to a computer or other configuration device, or by configuring the master fence node which communicates the information to the slave fence nodes via the fence network.

Node IDs may be assigned to the fence nodes at configuration or the fence nodes may have node IDs preset at the factory. The node IDs allow the association of distances and positions with specific fence nodes. Similarly, the assignment of which fence node acts as the master fence node and which fence nodes act as the slave fence nodes may be performed as a configuration step or may be performed at the factory. For instance, a master node may be physically different than the slave fence nodes in ways such as wall power versus battery power or additional communications methods other than the fence network communications capability, such as Wi-Fi or Ethernet.

Figure 3:
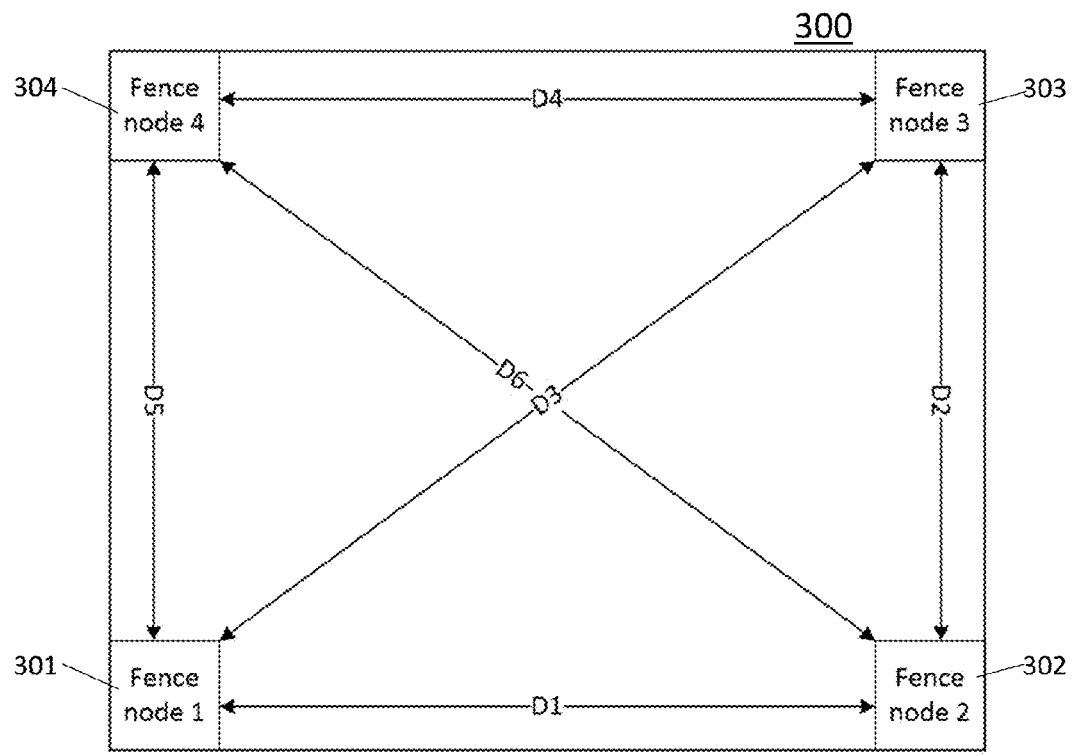
FIG. 3 is a pictorial illustration of an example rectangular room having a fence node defining the boundaries at each corner according to one aspect of the present disclosure.

Once the fence nodes are configured and physically placed, the fence nodes determine, at step 204, the distances to the other fence nodes in the fence network. This determination may be done, for instance by measuring the round trip delay between a message and a response using the fence network communications capability. FIG. 3 gives an example for a rectangular room 300 with a fence node 301, 302, 303, 304 at each corner.

The distances, D1 to D6, between pairs of fence nodes are determined, for instance via measuring the round trip delay of a message and its response over wireless communications (e.g., the fence network) between the fence nodes 301, 302, 303, 304. The distances calculated by a fence node 301, 302, 303, 304 may be reported to other fence nodes 301, 302, 303, 304 via the fence network. With this information, the shape of the fence can be determined and an ordered list of the nodes in a coordinate system with master fence node 301 (or whichever node is master) can be created, enabling determination of the location of a transient node and whether the transient node is inside the fence.

Figure 4:
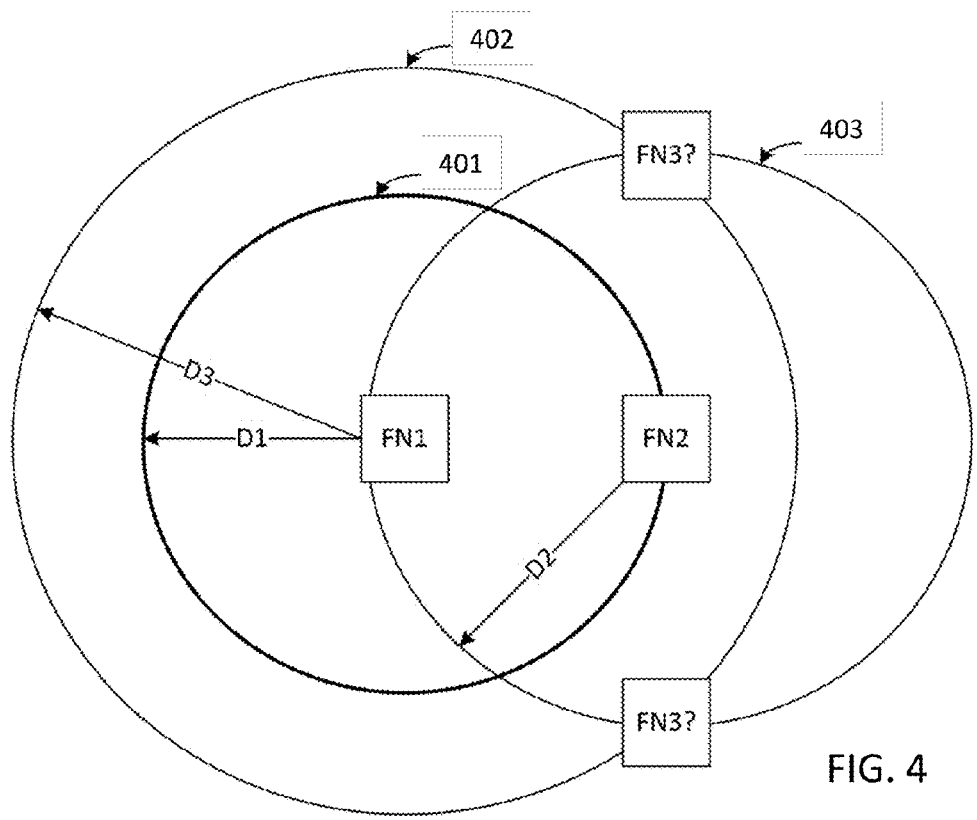
FIG. 4 is a pictorial illustration of an example process to start a determination of the sides of a geo-fence according to one aspect of the present disclosure.

FIG. 4 visually illustrates the start of the determination of the sides a fence, and therefore the fence, by determining, at step 206, the coordinates of each fence node relative to the master fence node FN1. Master fence node FN1 and fence node FN2 determine, for instance, via messaging round trip delay, that they are at a distance D1 from each other. This determination means, from FN1's point of view, FN2 is somewhere on circle 401. Since the fence creation method is interested in relative positions, the line between FN1 and FN2 can arbitrarily be designated the x-axis of a Cartesian coordinate system with FN1 at (0, 0). Fence node FN1 and fence node FN3 determine that they are at a distance D3 from each other, indicating that FN3 is somewhere on circle 402. Fence node FN2 and fence node FN3 determine that they are at a distance of D2 from each other, indicating that, from FN2's point of view, FN3 is on circle 403. Since FN3 is on both circle 402 and circle 403, FN3 can only be in one of two places where those two circles intersect. Since relative positions are desired and absolute positions are unnecessary, which of these two positions is selected does not matter as both positions form the same triangle, just viewed right side up or upside down with respect to each other. This triangle is sufficient to determine a 3-sided fence, for instance, by passing the distances to the master fence node FN1 to perform calculations. The position of further fence nodes can be determined relative to the coordinate system onto which these first three points are mapped.

Figure 5:
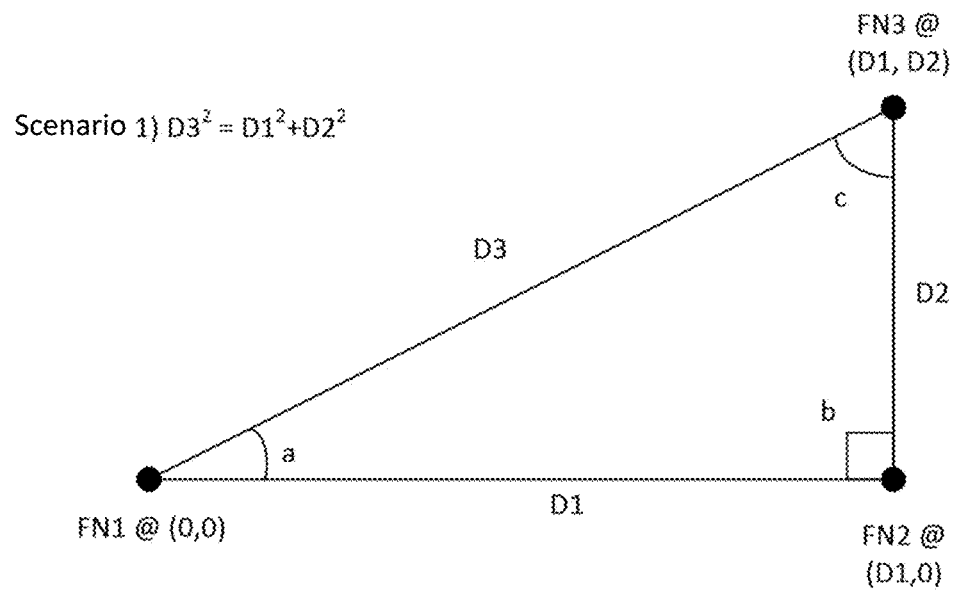
FIG. 5 is a pictorial illustration of two example scenarios for finding the coordinates of fence node FN3 of FIG. 3.
Figure 5:
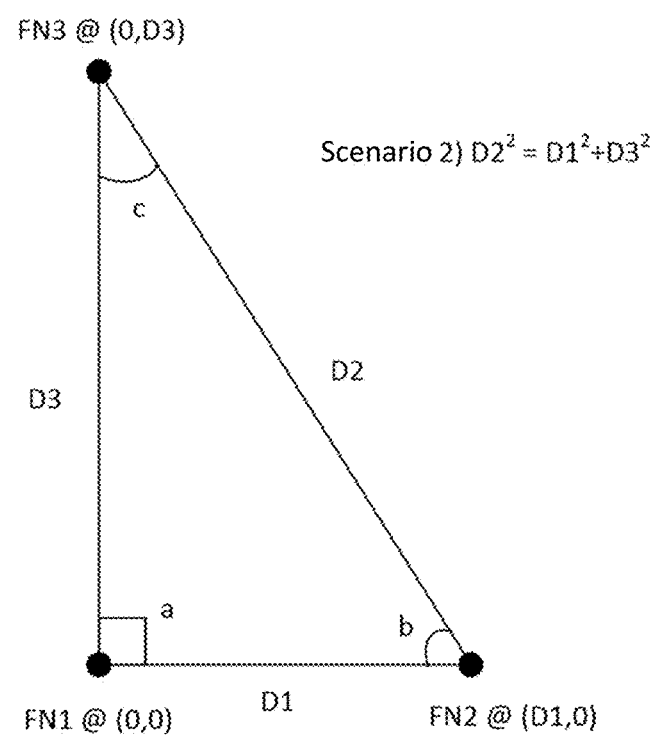
Figure 6:
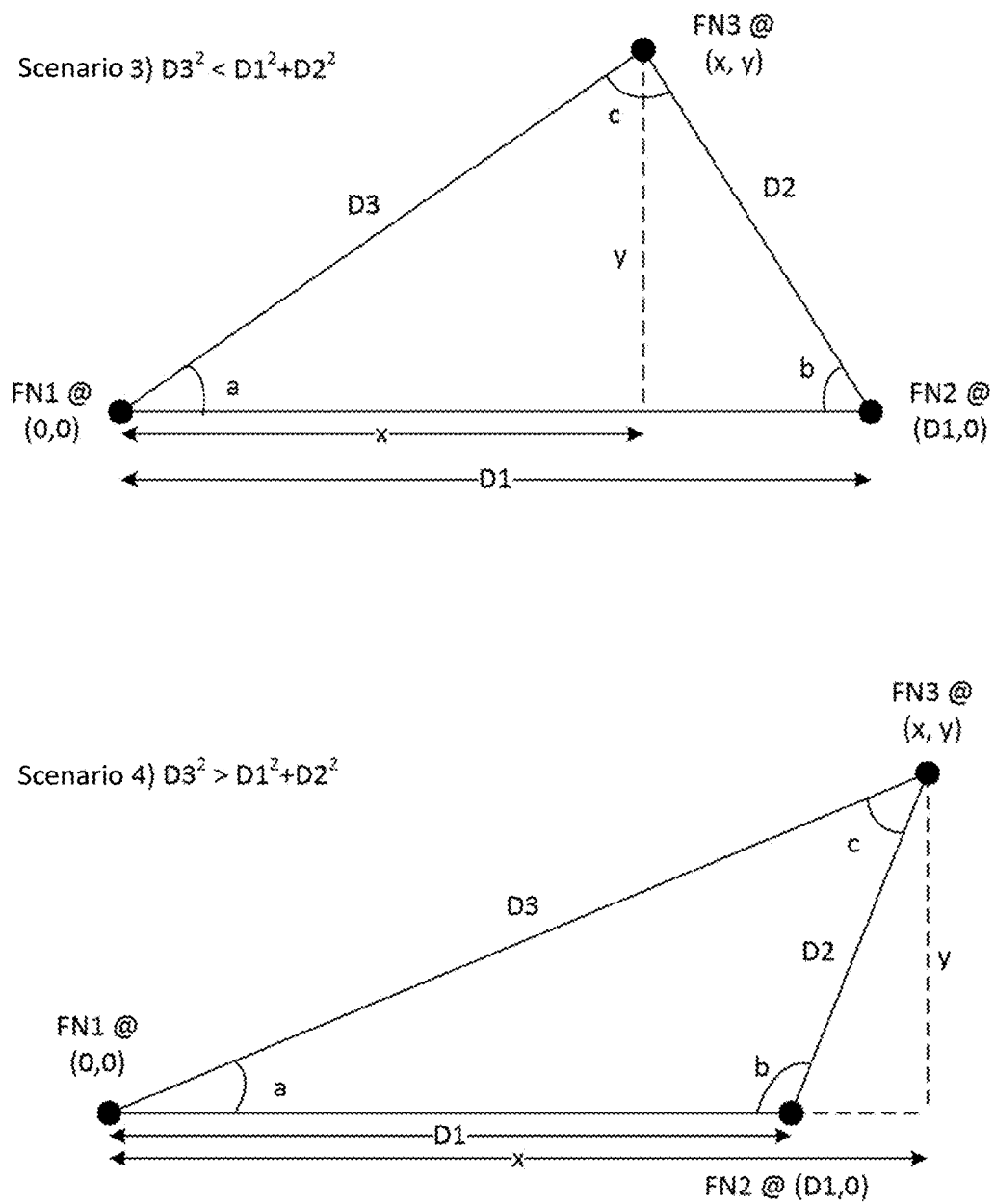
FIG. 6 is a pictorial illustration of two additional example scenarios for finding the coordinates of fence node FN3 of FIG. 3.

FIGS. 5 and 6 illustrate four scenarios for finding the coordinates of fence node FN3. Note that not all sides of the triangles used in the examples may become sides of the fence, for example, while distance D3 is the side of a triangle in the examples below, if the example is the rectangular room shown in FIG. 3, the pair (FN1, FN3) does not represent a side of the fence. The path from fence node FN1 to fence node FN2 is defined as being the x axis of the coordinate system with fence node FN1 at the origin. Which scenario is happening for a set of 3 distances is determined by the relationship between $D1^2$, $D2^2$, and $D3^2$ as shown in FIGS. 5 and 6. Once the scenario is identified, the relative position of the third node may be calculated. The result in the case of scenarios 1 and 2 is as shown in FIG. 5.

The calculations for scenario 3 and the calculations for scenario 4 are the same. The coordinates of fence node FN1 and fence node FN2 are given by definition and all other fence nodes are positioned relative to these two. First, in equation [1], some temporary variables are assigned for the lengths of the sides to better correspond to traditional trigonometric nomenclature for naming an angle and the side of a triangle opposite the angle as a lower case letter and the corresponding upper case letter.

$$A=D2, B=D3, C=D1 \quad [1]$$

From the laws of cosines, equations [2], [3], and [4] are obtained. If angle a is an obtuse angle, it may be more convenient to apply the laws of cosines from the point of view of angle b and side B.

$$A^2 = B^2 + C - 2BC\cos a \quad [2]$$

$$2BC\cos a = B^2 - C^2 - A^2 \quad [3]$$

$$\cos a = \frac{B^2 - C^2 - A^2}{2BC} \quad [4]$$

From the definition of cosine, equations [5] and [6] are obtained.

$$\cos a = x/B \quad [5]$$

$$x = B \cos a \quad [6]$$

Substituting equation [4] into equation [6], equations [7] and [8] are obtained. Equation [8] gives the x-axis coordinate of fence node FN3.

$$x = \frac{B^2 + C^2 - A^2}{2C} \quad [7]$$

$$x = \frac{D3^2 + D1^2 - D2^2}{2D1} \quad [8]$$

From the Pythagorean Theorem, equations [9], [10], and [11] are obtained.

$$B^2 = y^2 - x^2 \quad [9]$$

$$y^2 = B^2 - x^2 \quad [10]$$

$$y = \sqrt{B^2 - x^2} \quad [11]$$

Substituting, in equation [12], the y-axis coordinate of fence node FN3 is obtained.

$$y = \sqrt{D3^2 - x^2} \quad [12]$$

A fourth fence node, and so on, can have its position determined relative to fence nodes FN1 and FN2 in a similar fashion. These determinations may be coordinated by the master fence node FN1 via the fence network.

There are other scenarios, such as where angle a is an obtuse angle (i.e. x is negative for fence node FN3 and $D2^2 > D1^{2+} D3^2$). One skilled in the art would be able to apply the Laws of Cosines and other trigonometric formulas to these scenarios, as well.

Returning to flowchart 200, the sides of the fence are determined at step 208. For most room configurations, e.g., rectangular or at least convex, it is convenient to determine the ordering of the sides of the fence nodes by defining the first side as the side connecting the master fence node to the closest slave node. Alternatively, instead of beginning from the position of the master fence node, the process may begin at the position of any fence node designated by the master fence node or some other controlling entity. The next side may be the side connecting that slave fence node to the not yet connected slave fence node closest to the first slave node, and so on. When no unconnected nodes remain, the fence is closed by connecting to the master fence node.

Figure 7:
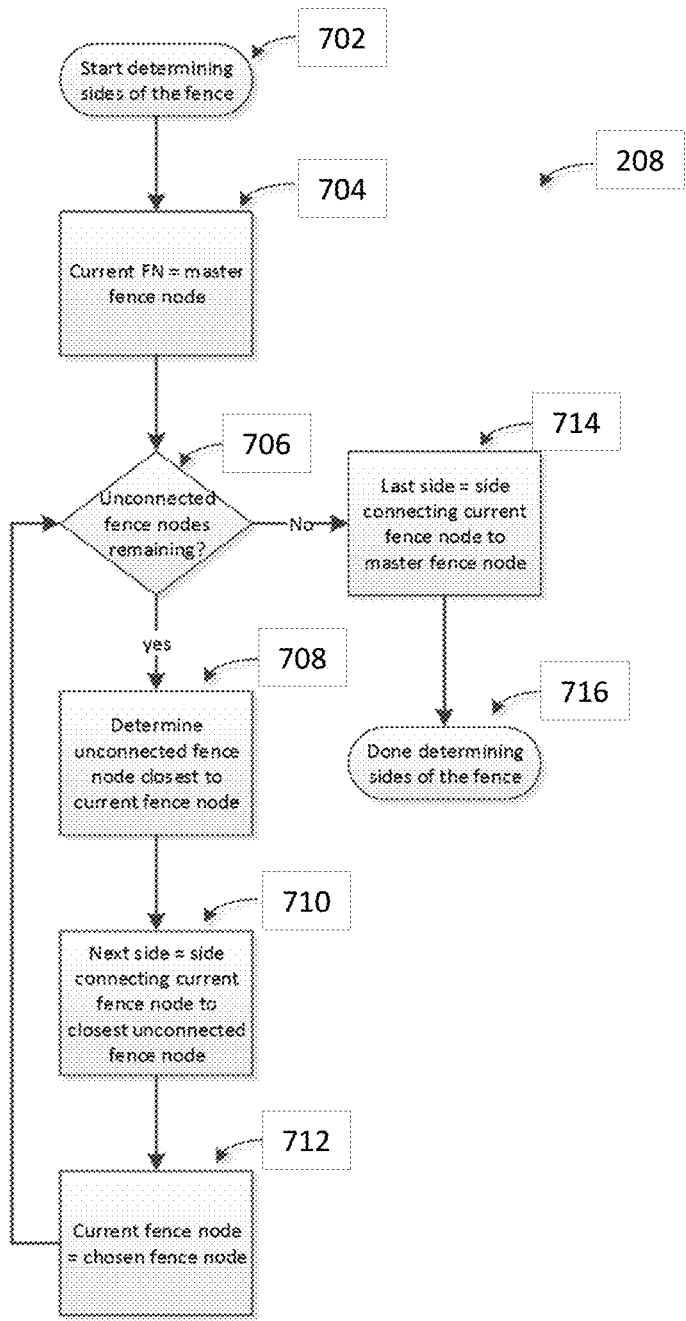
FIG. 7 is an example flowchart illustrating an expansion of the block "determine sides of the fence" from FIG. 2 in accordance with one aspect of the present disclosure.

FIG. 7 is a flowchart illustrating an expansion of step 208. The process starts determining the ordering of the sides of the fence nodes, at step 702, by setting the current fence node as the master fence node, at step 704. If there are unconnected fence nodes remaining, at step 706, the unconnected fence node closest to the current fence node is determined, at step 708. The next side of the fence is defined, at step 710, as the side connecting the current fence node to the closest unconnected fence node. At step 712, the closest unconnected fence node, as determined at step 708, is set to be the current fence node and the process returns to decision block 706 to determine whether there are any unconnected fence nodes remaining. When no unconnected fence nodes remain, at step 705, the last side of the fence is determined to be the side connecting the current fence node to the master fence node, at step 714, and the process ends at step 716. For the room in the example of FIG. 3, since 301 is the master fence node and 304 is the closest slave fence node, the fence sides could be identified as (301, 304), (304, 303), (303, 302), and (302, 301).

Note that to save resources in a deployment with multiple fences, a fence node may be a member of two fences simultaneously, for instance, if the fence node is on the wall between two rooms. One skilled in the art would understand how such a node could be configured to participate in two fences using the same or different communications capabilities for the fence network of each fence.

Figure 8:
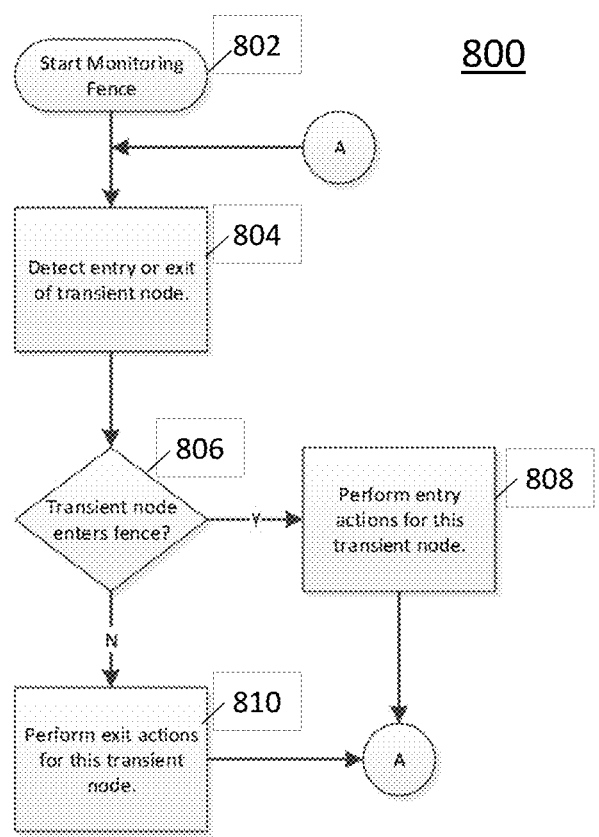
FIG. 8 is a flowchart illustrating an example process of monitoring for and acting upon a transient node entering or exiting the geo-fenced area according to one aspect of the present disclosure.

Turning now to FIG. 8, a flowchart 800 illustrating an example process of monitoring for and acting upon a transient node, possibly associated with another device, entering or exiting the fence is shown. The fence network begins monitoring the fence at step 802. When a transient node with capability to communicate with the fence network is within communications range of the fence, some or all of the fence nodes of the fence may be able to detect, at step 804, entry or exit of the transient node by determining a distance to the transient node in a fashion similar to that used in establishing the fence. If at least 3 fence nodes can determine their distance from the transient node, the position of the transient node can be determined, for example via trilateration.

Once the geo-fence is defined and the location of the transient node is determined, there are known algorithms for determining whether a point (i.e. a transient node) is inside the fence or outside the fence. Monitoring may be continuous or periodic, allowing changes in transient node position to be determined. When it is detected that a transient node has entered the fence, at step 806, entry actions are taken, at step 808. Example actions include enabling certain functionality of a device associated with the transient node or another device, joining a specific communications network other than the fence network, and so on. Additionally, special areas, or sub-fences, within a fence may be identified. Different actions may be taken when a transient node enters or exits a sub-fence. One skilled in the art would understand that sub-fences do not require additional fence nodes as a transient node at any point in the sub-fence may be located via trilateration by 3 or more fence nodes of the main fence.

The actions taken may apply to all transient nodes that enter the fence or may be specific to a class of transient nodes or an individual transient node. The actions and any necessary parameters may be configured in a fence node (for instance, the master fence node) or retrieved by a capable fence node (for instance, from a serving computer over Wi-Fi or Ethernet). The actions and parameters may be communicated to the transient node or other devices via the fence network. Some actions and parameters may be stored in the transient node, which may receive a command via the fence network to take the actions.

When a transient node has exited the fence, but is still within communications range of the fence network, at step 806, exit actions may be performed, at step 810. These actions may include, but are not limited to, actions opposite the entry actions, for instance, disabling certain functionality of the device associated with the transient node or another device, leaving a specific communications network other than the fence network, and so on.

Figure 9:
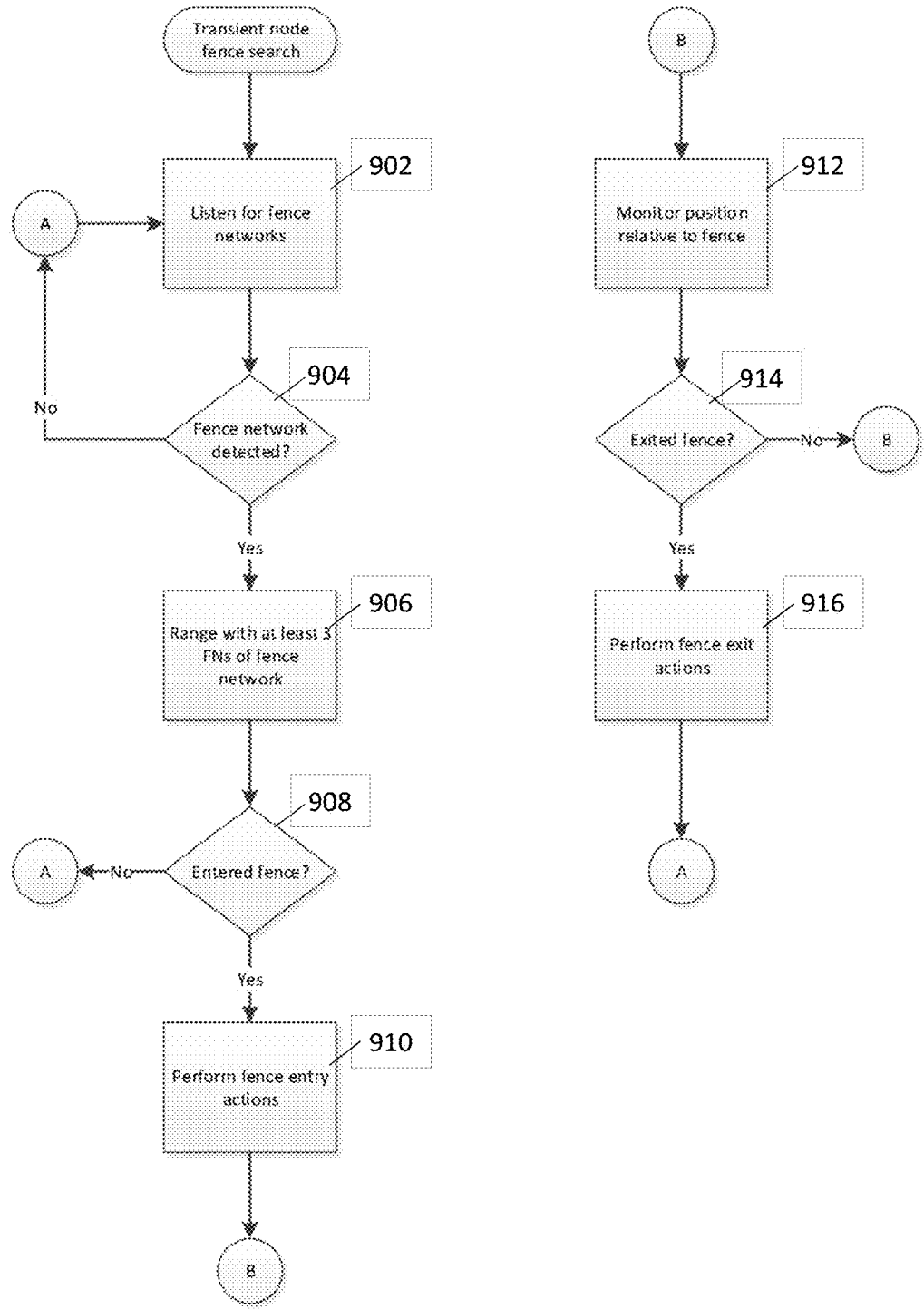
FIG. 9 is an example flowchart illustrating the basic operation of a transient node in accordance with one aspect of the present disclosure.

FIG. 9 shows a flowchart 900 illustrating the basic operation of a transient node, such as transient nodes 120, 122. The transient node starts, at step 902, by listening for fence networks. When a fence network is detected, at step 904, and the transient node is within communication range of at least 3 fence nodes of the fence network, at step 906, the location of the transient node relative to the fence may be determined via trilateration. In an embodiment, the master fence node may initiate and direct ranging, collecting the range information and determining whether the transient node is inside the fence. It should be noted that the term "ranging" may include accommodating a round-trip delay as well as any other procedure used for distance estimation. In another embodiment, another node, such as the transient node, initiates ranging, at step 906. If the transient node has not entered the fence, at step 908, the transient node continues to listen for fence networks, at step 902, periodically ranging to determine whether the transient node has entered a fence. If the transient node has entered the fence, at step 908, the transient node performs any actions associated with entering that fence, at step 910, possibly taking direction and configuration from one of the fence nodes via the fence network. While the transient node is within the fence, the transient node continues to monitor its own position, at step 912, by ranging with at least three fence nodes of the fence. In an alternate embodiment, the master fence node monitors the position of the transient node by directing it to range with at least three fence nodes of the fence. This ranging may be periodic, or may be stimulated by an event such as an accelerometer or other motion detection capability signaling that the transient node has moved. Such a capability may also be used to determine when to check for fences while not within a fence. If the transient node determines it has exited the fence, at step 914, the transient node performs fence exit actions, at step 916, possibly taking direction and configuration from one of the fence nodes via the fence network.

Figure 10:
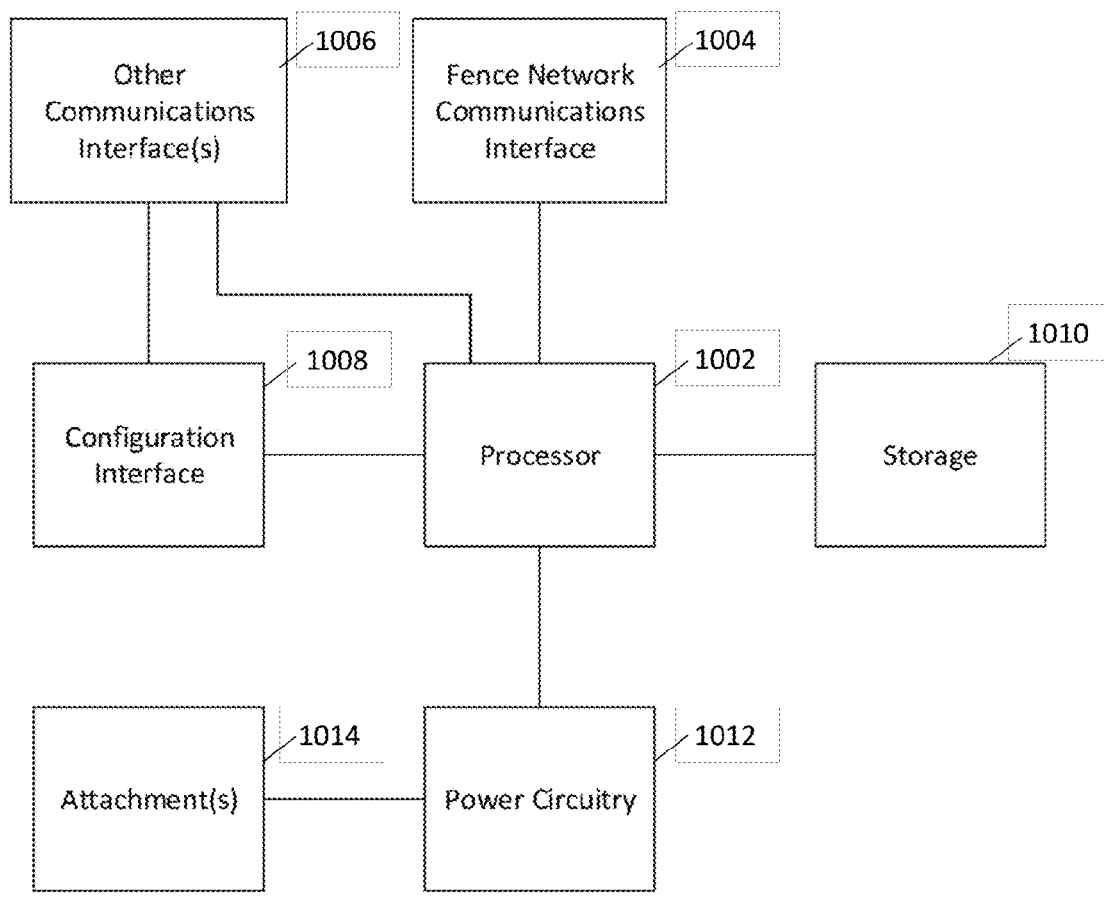
FIG. 10 is a schematic illustration of an example node in accordance with one aspect of the present disclosure.

Referring now to FIG. 10, a block diagram of an example node 1000 is provided. Example node 1000 may comprise such as nodes 104, 106, 108, 110, 120 or 122 of FIG. 1. The processor 1002 processes communications received and transmitted by the node. The processor 1002 can also process inputs from and outputs to the fence network communications interface 1004, the configuration interface 1006 and other communications interface(s) 1008. The storage 1010 may store data for use by the processor 1002, including distances between nodes. The storage 1010 may also be used to store computer readable instructions for execution by the processor 1002. The computer readable instructions can be used by the node for accomplishing the various functions of the node. In an example embodiment, the storage 1010 or parts of the storage 1010 may be considered a non-transitory machine readable medium.

The fence network communications interface 1004 provides the capability for nodes to communicate with each other over the fence network. The fence network communications interface 1004 uses technology suitable for determining distance via round trip messaging timing, such as specified in IEEE 802.15.4-2011. The fence network communications interface 1004 performs distance determinations between fence nodes to define the fence and between fence nodes and a transient node to determine the location of the transient node, for example, using trilateration. The fence network communications interface 1004 may be used to communicate information associated with configuration of the fence, a fence node, or a transient node. The fence network communications interface 1004 may be used to convey actions and parameters of actions to transient nodes when entering, exiting, or movement within the fence triggers an action. The fence nodes and transient nodes of a system have compatible fence network communications interfaces 1004.

The configuration interface 1006 provides the logic and any physical capabilities required to configure a node. For instance, configuration interface 1006 may include logic that allows the node to be configured over the fence network via the fence network communications interface 1004. The configuration interface 1006 may include pins and jumpers, toggles, switches, a SIM card, factory installed parameters in memory, or other hardware means of configuration. The configuration interface 1006 may include a communications mechanism other than the fence network communications interface 1004, for instance, USB, Ethernet, Wi-Fi, or the like or may be connected to an other communications interface 1008 that may support configuration, and may also provide capabilities to provide node specific actions, such as a transient node establishing communications with another device over a Wi-Fi network that is not the fence network. The configuration interface 1006 may include a user interface such as a display and one or more entry devices such as a keyboard and mouse.

The power circuitry 1012 provides power to the node. The power circuitry 1012 may supply power via an external source such as wall power (e.g., 110V or low voltage as is commonly used in home thermostats), universal serial bus (USB), power over Ethernet (PoE), or such means as is known to one skilled in the art. The power circuitry 1012 may provide battery backup, optionally with recharging, in the event of loss of power. The power circuitry 1012 may provide solely battery power, either with disposable batteries or a capability to temporarily connect to an external power source to recharge the battery. For transient nodes which may be associated with another device, the power circuitry 1012 may also interface to the other device's power system in order to provide power to the transient node.

For concise explanation, the node or aspects of the node are described as having certain functionality. It will be appreciated that in some aspects, this functionality is accomplished by the processor 1002 in conjunction with the storage 1010, the configuration interface 1006, the fence network communications interface 1004 and other communications interface(s) 1008. Furthermore, in addition to executing instructions, the processor 1002 may include specific purpose hardware to accomplish some functions.

The node may also contain one or more attachments 1014. The attachment(s) 1014 may have numerous embodiments depending upon the type of node 1000 and its implementation. A simple attachment 1014 for a slave fence node may, for instance, comprise mounting hardware for mounting the slave fence node on a physical wall. A more complex attachment 1014 for a transient node may include connectors, wires, or other hardware to optionally interface between the power circuitry 1012 and a device to which the transient node is connected.

One skilled in the art would understand how these options could be applied to master fence nodes, slave fence nodes, and transient nodes and that different options may be used by each.

Alternative methods for determining a fence will now be described for which the vertices of a fence are not necessarily located at the fence nodes. For purposes of describing these example alternative methods, the following assumptions are made:
1. All fence nodes are placed in a horizontal plane or a plane that is almost horizontal.
2. A transient node or location marker is not necessarily in the same plane as the fence nodes.
3. The height of a transient node or location marker is not relevant for determining whether the transient or location marker is inside or outside the fence as long as the transient or location marker is within range of at least 3 fence nodes.
4. For trilateration purposes, a three-dimensional coordinate system is assumed, where the z-coordinate of each fence node is zero (i.e. z=0). The z-axis is orthogonal to the plane determined by the fence nodes. The direction of the z-axis, i.e. whether it is pointing upward or downward, is not essential. Once the coordinates of a transient node or location marker have been determined, the z-coordinate may be ignored or set to zero.

Figure 11:
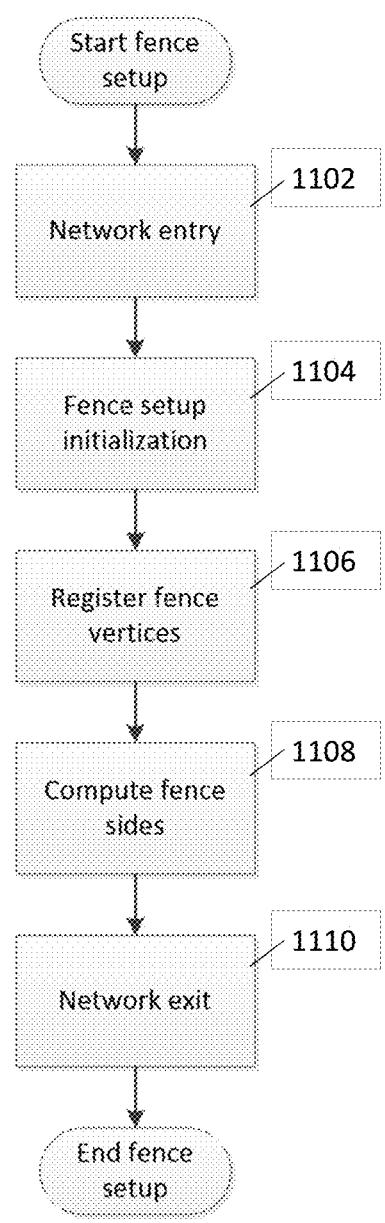
FIG. 11 is a flowchart illustrating an alternate example process for defining a geo-fence in accordance with one aspect of the present disclosure.

As described above, with respect to the method described in FIG. 2, it is assumed that a fence network has been set up, a coordinate system has been defined relative to the fence network, and the coordinates of the fence nodes have been determined according to the process of FIG. 2. However, contrary to the above method, an embodiment described with reference to flowchart 1100 of FIG. 11 is of a fence that is not necessarily defined by the placement of the fence nodes. That is to say, the paths between the fence nodes are not necessarily the sides of the fence, and a different method than described above, with respect to FIG. 2, will be described that allows for more complex shapes, fewer fence nodes than fence vertices, and more easily defined sub-fences.

A summary of a possible method for defining a fence is as follows: A location marker is used for determining the position of the fence vertices. In sequence, a user places the location marker at the desired location of each fence vertex, and, while the location marker is at the vertex position, the distance between the location marker and three or more fence nodes are measured. Using these distance measurements and the known coordinates of the fence nodes, the coordinates of the vertex are computed using trilateration. After all the vertex positions have been registered, the sides of the fence are computed.

Referring now to FIG. 11, beginning at step 1102, a location marker and a fence network may perform network entry procedures unless this procedure has already been performed. A location marker is a node that is not a fence node, but may communicate with the fence nodes and may be used for setting up a fence. These network entry procedures may follow standard protocols such as those defined by IEEE Std. 802.15.4, Wi-Fi, or ZigBee. The network entry procedures may comprise mutual authentication of the fence network and the location marker as well as authorization of the location marker to enter the fence network. Authentication and authorization are not essential steps for defining a fence, but may provide protection against malicious or involuntary fence setup or destruction. During network entry, the location marker may be assigned a Node ID used in subsequent communications on the fence network. Network entry procedures may be coordinated by the master fence node or may be distributed among the fence nodes.

Once the location marker is on the fence network, the location marker may initiate fence setup, at step 1104. The fence setup initiation may be triggered by a user through a user interface, or it may, alternatively, be triggered by the completion of the network entry procedures. During fence setup initialization, a message exchange may take place between the fence network and the location marker. During this message exchange, a fence ID may be allocated by the fence network, fence nodes may be prepared for ranging with the location marker, the location marker may be provided with sufficient information to initiate the ranging with each of (a subset of) the fence nodes as well as the coordinates of each of those fence nodes, etc.

When the fence initialization has been completed, the user may be informed that the location marker is ready to register a first fence vertex, at step 1106. For example, the readiness may be indicated by a light emitting diode (LED) lighting up, a sound, or a message on a screen. The registration of a fence vertex is detailed by flowchart 1500 and described in more detail later in reference to FIG. 15. After the registration of a fence vertex has been completed, the location marker may indicate to the user that a next vertex is ready to be registered. This process is repeated until all vertices have been registered. The user may indicate, e.g., by depressing a button or through a graphical user interface (GUI), that all fence vertices have been registered.

The sides of the fence may be computed using one of several possible methods described below. A system may implement one or several of these methods and, if several methods are implemented, allow the user to choose, by means of a user interface, which method to use.

One method is to use the order in which the vertices were registered to determine the sides of the fence. This method, which assumes that the fence is a closed polygon, consists in joining consecutive vertices by straight line segments. The first and last vertices are also joined by a straight line segment. This method requires the user to register the vertices in the correct order. For example, to fence in a room, the user could follow the walls of the room in one direction (clockwise or counter-clockwise) and register a vertex in each corner. This method allows the fence to be of any arbitrary shape.

An alternative method for computing the sides of a fence does not require the vertices to be registered in any particular order. This method is based on the assumption that the fence does not contain acute angles and is illustrated in FIG. 12.

Figure 12:
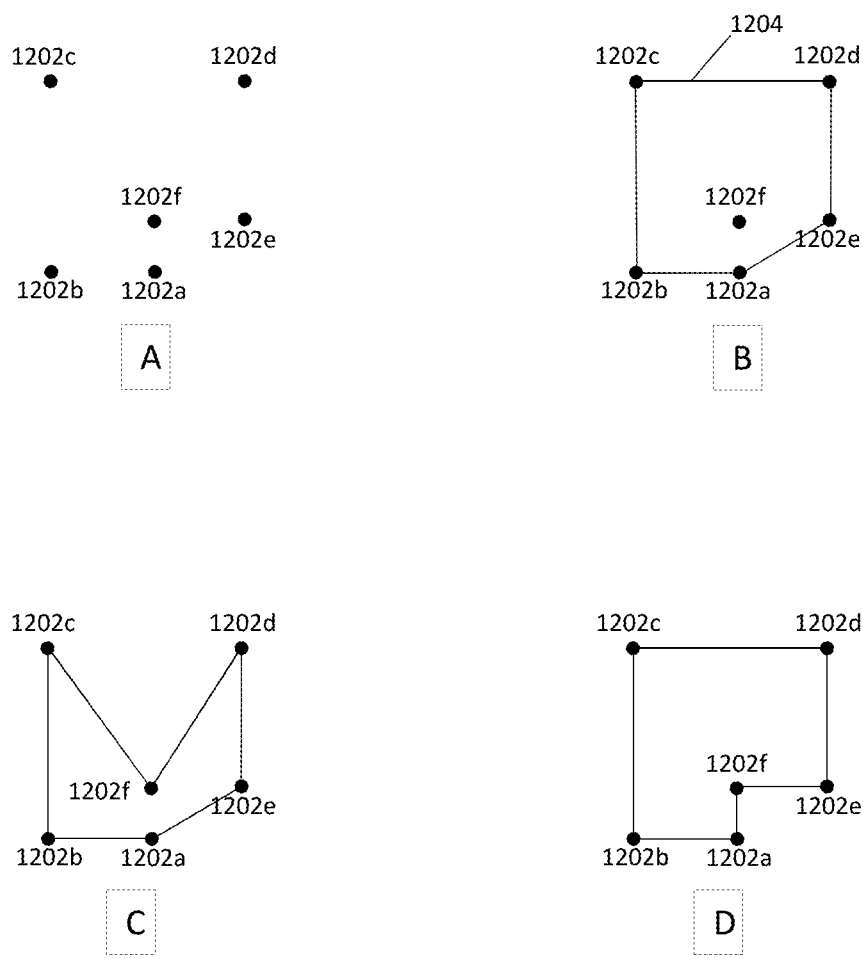
FIG. 12 is a pictorial illustration depicting an alternative process for computing the sides of a geo-fence in which the vertices are not required to be registered in a particular order according to one aspect of the present disclosure.

Scenario A in FIG. 12 shows an example of registered vertices 1202a, 1202b, 1202c, 1202d, 1202e, 1202f (referenced collectively as vertices 1202) of a fence. The fence may be determined by joining these vertices 1202 with straight lines segments that do not intersect. There are multiple possibilities depending on in which order the vertices 1202 are joined, as illustrated by scenarios C and D. To determine a likely ordering of the vertices 1202, the method may first compute the convex hull 1204 of the vertices 1202. Methods for computing the convex hull of a finite set of points are well-known. The convex hull 1204 is illustrated by scenario B. If there are no vertices inside the convex hull 1204, then the fence is fully determined. However, if, as in the example of FIG. 12, there are interior vertices 1202f, the method may check each possible ordering consistent with the ordering of the non-interior vertices 1202a-1202e as determined by the convex hull 1204, and select the ordering that does not yield acute angles. For instance, placing the interior vertex (i.e. vertex 1202f) in FIG. 12 between the two top vertices (i.e. vertices 1202d and 1202e) yields acute angles, as shown by scenario C, as opposed to placing the interior vertex 1202f between the two bottom-right vertices (i.e. vertices 1202a and 1202b), as shown by scenario D. The same method may also be applied when more than one vertex is inside the convex hull. This method may be accommodated to allow for angles that are acute yet very close to being right (i.e. 90 degrees). For example, the method may choose the ordering of the vertices whose minimum acute angle is greatest. Alternatively, the method may ignore acute angles greater than a threshold, e.g., 80 degrees. The location marker may include a graphical user interface which may show the horizontal or other projections of the fence and allow the user to make corrections if necessary. As an alternative to the method disclosed for step 208, this method also applies to the case in which the fence vertices do not all coincide with the fence nodes.

Returning to FIG. 11, the computation of the sides of the fence, at step 1108, may start before all fence vertices have been registered or after all fence vertices have been registered. In an example embodiment, the computation of the fence sides may be performed by the location marker and communicated to other nodes. The nodes to which the fence definition is communicated depends on the roles of those nodes in monitoring a transient node, as described above. A person skilled in the art will appreciate that there are various ways the processes required for computing the fence sides may be deployed. A person skilled in the art will also appreciate that the fence sides provide one of several possible representations of a fence that allow for determining whether a transient node is inside or outside the fence, or whether it is entering or exiting the fence.

Figure 13:
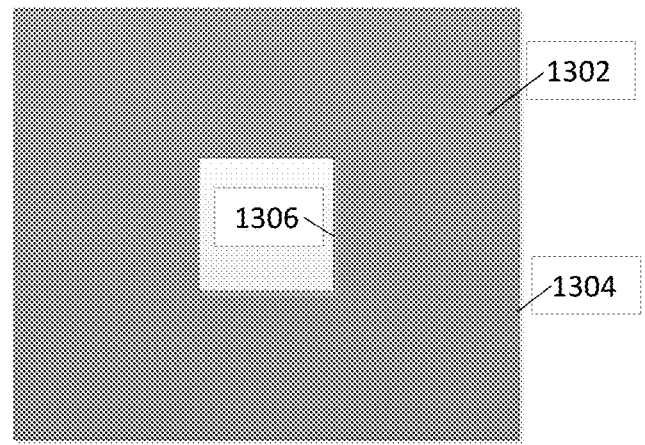
FIG. 13 is a pictorial illustration of an example fence enclosing an area in accordance with an aspect of the present disclosure.

After a fence has been defined the location marker may exit the network, at step 1110. Alternatively, the user may be given, through a user interface, the option to define another fence. Several fences may be combined into a single fence using Constructive Area Geometry (CAG). For example, a fence enclosing the shaded area 1302 in FIG. 13, which could be the area within a workshop with the exclusion of an area surrounding the work bench, may be defined by first defining a fence enclosing the outer rectangle 1304, thereafter defining a fence enclosing the inner square 1306, and finally defining a fence 1302 as the boundary of the area of the outer rectangle less the area of the inner square. Note that such a fence may be regarded as a special case of two fences where the entry actions associated with the inner fence are the same as the exit actions of the outer fence, and vice versa, the exit actions of the inner fence are the same as the entry actions of the outer fence. Alternative to defining one fence, two fences may be defined with independent entry and exit actions associated with each.

Figure 14:
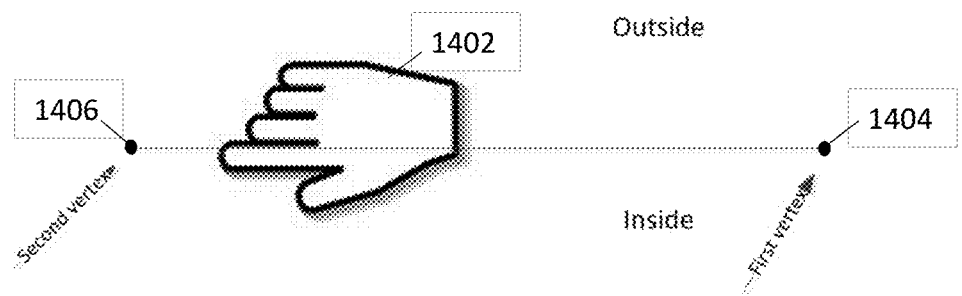
FIG. 14 is a pictorial illustration depicting a "right-hand rule" for determining the side of the fence that is inside the geo-fenced area according to one aspect of the present disclosure.

The methods for defining a fence described so far assume that the fence is a closed polygon. This may not always be the case. For instance, a fence may be defined across a doorway to trigger, e.g., an alarm, if a transient node exits a room. Such a fence may be defined by registering two vertices. The fence, in this case, is delimited by a line. The side of the fence that is the inside may be defined using a "right hand rule," as shown in FIG. 14. By placing a right hand 1402 in the direction from the first vertex 1404 to the second vertex 1406, the inside of the fence is the side of the thumb. A user interface may allow a user to select the type of fence to be set up.

Figure 15:
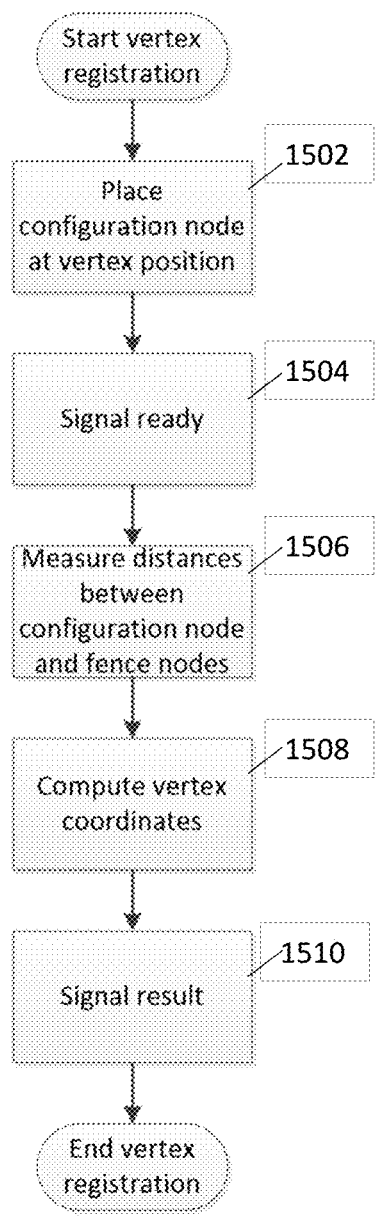
FIG. 15 is a flowchart illustrating an example process for registering vertices of a geo-fence in accordance with one aspect of the present disclosure.

Turning now to FIG. 15, one example method of registering vertices is shown by flowchart 1500. The vertex registration may start, at step 1502, with the user placing the location marker at the desired vertex position. For example, the user may place the location marker in the corner of a room, a desk, a table, etc. When ready, at step 1504, the user may push a button to signal to the location marker that distance measurements may start. The distance between the fence node and the location marker may be measured, at step 1506, in the same way as the distance between a fence node and a transient node, as described in above in reference to FIG. 2. When the distances between the location marker and at least three fence nodes have been measured, the coordinates of the location marker may be computed, at step 1508, through trilateration, and the result is returned, at step 1510.

Trilateration consists of determining the coordinates of a point given the distances of the point to three non-collinear points for which the coordinates are known. Methods of trilateration, including both 2-dimensional and 3-dimensional trilateration, are well-known to those skilled in the art.

The same methods described above in relation to FIGS. 8 and 9 for determining the coordinates of a transient node may be applied for determining the coordinates of the location marker. Likewise, the description of a node provided in FIG. 10 may also be applied to the location marker. As for any of the nodes, the location marker may have a configuration interface 1006 which may include a user interface. In particular, the location marker may have an interface that allows the user to indicate when a new fence vertex is to be registered, such as a push button, a keyboard or a button on a graphical user interface. The user interface may include a speaker, LEDs, liquid crystal display (LCD) screen, or other, to provide feedback to the user when a fence vertex has been registered. A user interface may also be used by the user to indicate when a fence setup has been competed, or to make changes and adjustments to defined fences, including combining fences into one fence using CAG. The user interface may be partly or fully implemented on another device that communicates with the location marker through an other communications interface 1008 or fence network communications interface 1004. For example, a computer (e.g., a laptop, tablet or smart phone) may run a program that provides a graphical user interface used to interact with the location marker. In an embodiment, the location marker and the transient node may be combined into one device.

In referring to FIG. 11, an assumption was stated whereby all the fence nodes are on a same horizontal plane. This assumption may be removed if the following changes to the previous descriptions are made.

To determine the vertical direction, the location marker may be used to register two points on a vertical line. For instance, a user may, through a user interface, indicate that the registration of a vertical line is to start, and then register two points that are vertically aligned. The user may, for instance, use a corner of a room two ensure that the two points are on the same vertical line. The coordinates of the points on the vertical lines may be determined through trilateration.

If trilateration is based on only three fence nodes, then the equations used in determining the coordinates of each of the registered points may yield two solutions. The two solutions are on a line that is orthogonal to the plane through the three fence nodes, and, since that plane is not necessarily horizontal, that line is not necessarily vertical, and the projection of the two solutions on a horizontal plane may be distinct. However, sometimes one may assume that the location marker and transient nodes can only be on one side of the plane defined by the three fence nodes. For example, the fence nodes may be placed above a suspended ceiling or against an outer wall. This allows for disambiguation of the two solutions obtained through trilateration.

Another method for disambiguating the two solutions obtained through trilateration is to measure the distance to the location marker from a fourth fence node that is not on the same plane as the three other fence nodes. Measuring the distances between the location markers and four or more fence nodes also allows for more precise position estimates.

Once the vertical direction has been established, well-known methods exist for computing the horizontal projection of a point. Hence, the methods used for defining a fence may be applied. Likewise, the methods for monitoring and localizing a location marker described above may also be applied to a transient node.

One skilled in the art would understand that the methods and techniques described above can be applied in other fence scenarios, and with master fence nodes, slave fence nodes and transient nodes. One skilled in the art would understand that the methods and techniques described above can be applied in hardware, software, circuitry, functional blocks, or any combination thereof.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method of establishing a fence network, the fence network comprising a plurality of fence nodes in communication with each other, a plurality of fence vertices defining a geographic fence, the method comprising:
   configuring the plurality of fence nodes;
   setting up a coordinate system to determine a position of each fence node of the plurality of fence nodes;
   for each fence vertex
      setting a location marker at a position of the fence vertex;
      using the location marker to register the position of the fence vertex at least by:
         computing a convex hull from the position of each fence vertex; and
         determining whether any fence vertex is located inside the convex hull, wherein when a fence vertex is located inside the convex hull:
            calculating all possible orderings of fence vertices consistent with an ordering of the position of fence vertices located on an exterior of the convex hull; and
            defining sides of the geographic fence by selecting an order having a greatest minimum acute angle which is less than a predetermined threshold.

2. The method of claim 1, wherein at least one fence vertex is located at a position other than a position of a fence node.

3. The method of claim 1, wherein the plurality of fence vertices are registered in sequential order.

4. The method of claim 3, wherein using the location marker to register the position of the fence vertex comprises connecting the fence vertices in order of registration.

5. The fence network of claim 1, wherein using the location marker to register the position of the fence vertex further comprises:
   joining a neighboring fence vertex by a straight line segment to form a side of the geographic fence.

6. A fence network comprising:
   a plurality of fence nodes in communication with each other;
   a plurality of fence vertices defining a geographic fence;
   a plurality of sides of the geographic fence determined by:
   configuring the plurality of fence nodes;
   setting up a coordinate system to determine a position of each fence node of the plurality of fence nodes; and
   for each fence vertex
      setting a location marker at a position of the fence vertex;
      using the location marker to register the position of the fence vertex at least by:
         computing a convex hull from the position of each fence vertex; and
         determining whether any fence vertex is located inside the convex hull, wherein when a fence vertex is located inside the convex hull:
            calculating all possible orderings of fence vertices consistent with an ordering of the position of fence vertices located on an exterior of the convex hull; and
            defining sides of the geographic fence by selecting an order having a greatest minimum acute angle which is less than a predetermined threshold.

7. The fence network of claim 6, wherein at least one fence vertex is located at a position other than a position of a fence node.

8. The fence network of claim 6, wherein the plurality of fence vertices are registered in sequential order.

9. The fence network of claim 8, wherein using the location marker to register the position of the fence vertex comprises connecting the fence vertices in order of registration.

10. The fence network of claim 6, wherein using the location marker to register the position of the fence vertex further comprises:
    joining a neighboring fence vertex by a straight line segment to form one side of the plurality of sides of the geographic fence.

11. A computer program product for establishing a fence network, the fence network comprising a plurality of fence nodes in communication with each other, a plurality of fence vertices defining a geographic fence, the computer program product comprising:

a non-transitory storage medium readable by a processing circuit and storing instructions for execution by the processing circuit for performing a method comprising:

configuring the plurality of fence nodes;

setting up a coordinate system to determine a position of each fence node of the plurality of fence nodes; and for each fence vertex setting a location marker at a position of the fence vertex;

using the location marker to register the position of the fence vertex at least by:

computing a convex hull from the position of each fence vertex; and determining whether any fence vertex is located inside the convex hull, wherein when a fence vertex is located inside the convex hull:

calculating all possible orderings of fence vertices consistent with an ordering of the position of fence vertices located on an exterior of the convex hull; and defining sides of the geographic fence by selecting an order having a greatest minimum acute angle which is less than a predetermined threshold.

12. The computer program product of claim 11, wherein at least one fence vertex is located at a position other than a position of a fence node.

13. The computer program product of claim 11, wherein the plurality of fence vertices are registered in sequential order.

14. The computer program product of claim 12, wherein using the location marker to register the position of the fence vertex comprises connecting the fence vertices in order of registration.

15. The computer program product of claim 11, wherein using the location marker to register the position of the fence vertex further comprises:

joining a neighboring fence vertex by a straight line segment to form a side of the geographic fence.

\* \* \* \* \*